United States Patent
Lien et al.

(10) Patent No.: US 7,225,956 B2
(45) Date of Patent: Jun. 5, 2007

(54) RUBBER LOCKING DEVICE FOR BICYCLE SEAT BAG

(76) Inventors: Chien-Ping Lien, PO Box 82-144, Taipei (TW); Kuo-Ping Ho, PO Box 82-144, Taipei (TW)

( * ) Notice: Subject to any disclaimer, the term of this patent is extended or adjusted under 35 U.S.C. 154(b) by 294 days.

(21) Appl. No.: 10/975,424

(22) Filed: Oct. 29, 2004

(65) Prior Publication Data

US 2006/0043132 A1   Mar. 2, 2006

(30) Foreign Application Priority Data

Sep. 2, 2004   (TW) ............................... 93214084 U

(51) Int. Cl.
*B62J 9/00* (2006.01)
(52) U.S. Cl. .................. 224/427; 224/275; 224/463; 224/437
(58) Field of Classification Search ............... 224/427, 224/420, 421, 425, 426, 447, 448, 449, 450, 224/463, 455, 460, 572, 411, 409, 584, 585, 224/274, 275; 297/188.12; D12/409
See application file for complete search history.

(56) References Cited

U.S. PATENT DOCUMENTS

| 5,127,563 | A | * | 7/1992 | Chan et al. ................. 224/438 |
| D336,740 | S | * | 6/1993 | Graf ........................... D12/409 |
| 5,356,058 | A | * | 10/1994 | Fenton ........................ 224/427 |
| 5,573,163 | A | * | 11/1996 | Lee et al. ..................... 224/427 |
| 5,893,501 | A | * | 4/1999 | Schwimmer ................ 224/427 |
| 6,988,645 | B1 | * | 1/2006 | Nusbaum et al. ............ 224/519 |
| 2005/0035165 | A1 | * | 2/2005 | Tsai ............................ 224/427 |

FOREIGN PATENT DOCUMENTS

DE      20313357 U1  *  10/2003

* cited by examiner

*Primary Examiner*—Nathan J. Newhouse
*Assistant Examiner*—Corey N. Skurdal
(74) *Attorney, Agent, or Firm*—Leong C. Lei

(57) ABSTRACT

A rubber locking device for a bicycle seat bag is composed of a rubber strip which is fastened to the top of the seat bag by a clamp board, two hook bases correspondingly provided at two sides of the seat bag for fastening to the two ends of the rubber strip. The rubber strip is provided with pluralities of locking holes so that when the rubber strip goes through above the shafts under the bicycle seat, the two ends of the rubber strip are extensively pulled and the most appropriate locking holes can be fastened to the hook bases at the two sides of the seat bag to efficiently bind with the shafts under the seat and to obtain a preferred shock-absorbing function. A U fastener base provided at the front of the seat bag is composed of a U frame and a resilient rubber ring. The U fastener base is provided with locking hooks at two ends, such that after the U frame is leant against the seat post, the rubber ring is resiliently pulled and held around the other side of the seat post to lock with one of the hooks at the other side to firmly fasten to the underside of the seat.

4 Claims, 5 Drawing Sheets

RUBBER LOCKING DEVICE FOR BICYCLE SEAT BAG

BACKGROUND OF THE INVENTION (a) Technical Field of the Invention

The present invention relates to a rubber locking device for a bicycle. By way of the locking device, the seat bag can be installed and detached easily and instantly. Besides, as the locking device has the function of shock absorbing and can be firmly fastened to the bicycle, it is extremely applicable to bicycles.

(b) Description of the Prior Art

Among locking devices of the prior art, U.S. Pat. No. 5,245,517 disclosed a T clamp shaft which is fastened to the top of the seat bag, while a U clip is provided at the front end of the seat bag, thereby the T shaft is clamped to the two shafts under the seat, pulled forward to allow the U clip to smoothly lock onto the seat post under the seat for fastening purposes.

However, as the T clamp shaft must be leant against the underside of the seat and turned by force to clamp with the shaft, it is rather inconvenient in operation to those unskilled in the art.

SUMMARY OF THE INVENTION

The primary object of the invention is to provide a rubber locking device for a bicycle seat bag, which can allow detachment from the seat bag without utilizing any tool and obtain the purpose of convenient use.

Another object of the invention is to provide a rubber locking device for a bicycle seat bag, which has excellent shock-absorbing property and can firmly fasten the seat bag to avoid noise occurred by crush at the time of being in use.

To obtain the above objects, the rubber locking device for a bicycle seat bag according to the invention is made of plastic or rubber materials, such that even if the locking device is exposed to the rain, it would not become rusty. The locking device according to the invention includes a rubber strip, a clamp board, pluralities of hook bases, fastener boards, screws, a soft spacer, a U fastener base and a rubber ring, etc. Primarily, the rubber strip is assembled to fasten to the top of the seat bag, while locking bases are fastened to the left and right sides of the seat bag. The U fastener base and the rubber ring are fastened to the front end of the seat bag, such that the U fastener base can be fastened to the locking hook at one side of the U fastener base and then lean against the vertical seat post, and the rubber ring is resiliently pulled around the seat post to lock with the locking hook at the other side of the U fastener base. Furthermore, as the rubber strip is fastened to hook bases at two sides of the seat bag via the locking holes thereon after passing through the shafts under the seat, the rubber strip is integrally bound and fastened to the seat and the seat bag via its resilience recovery. Accordingly, the effect of quick installment and detachment can be accomplished.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
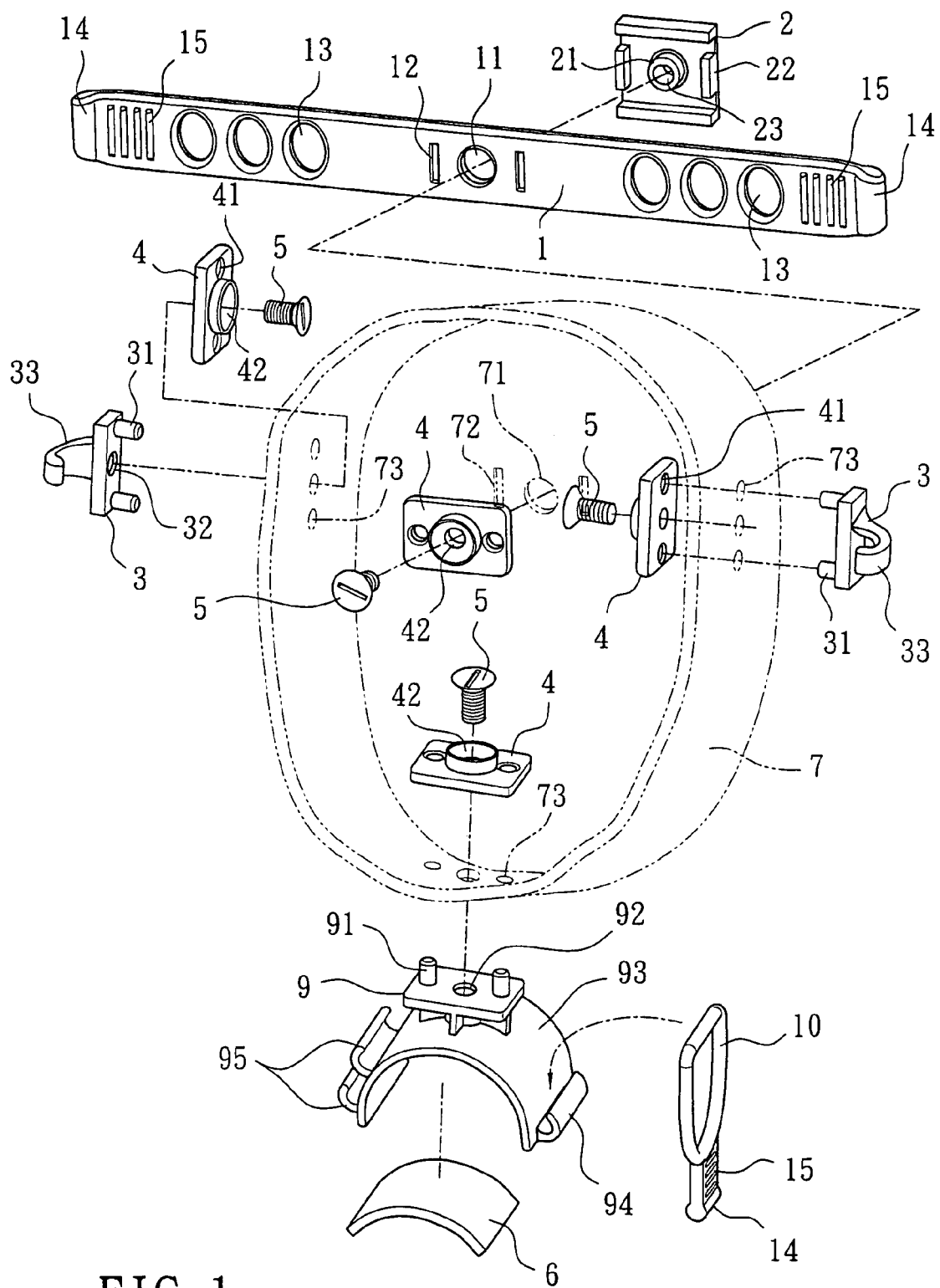
FIG. 1 is an exploded view of the present invention.
Figure 2:
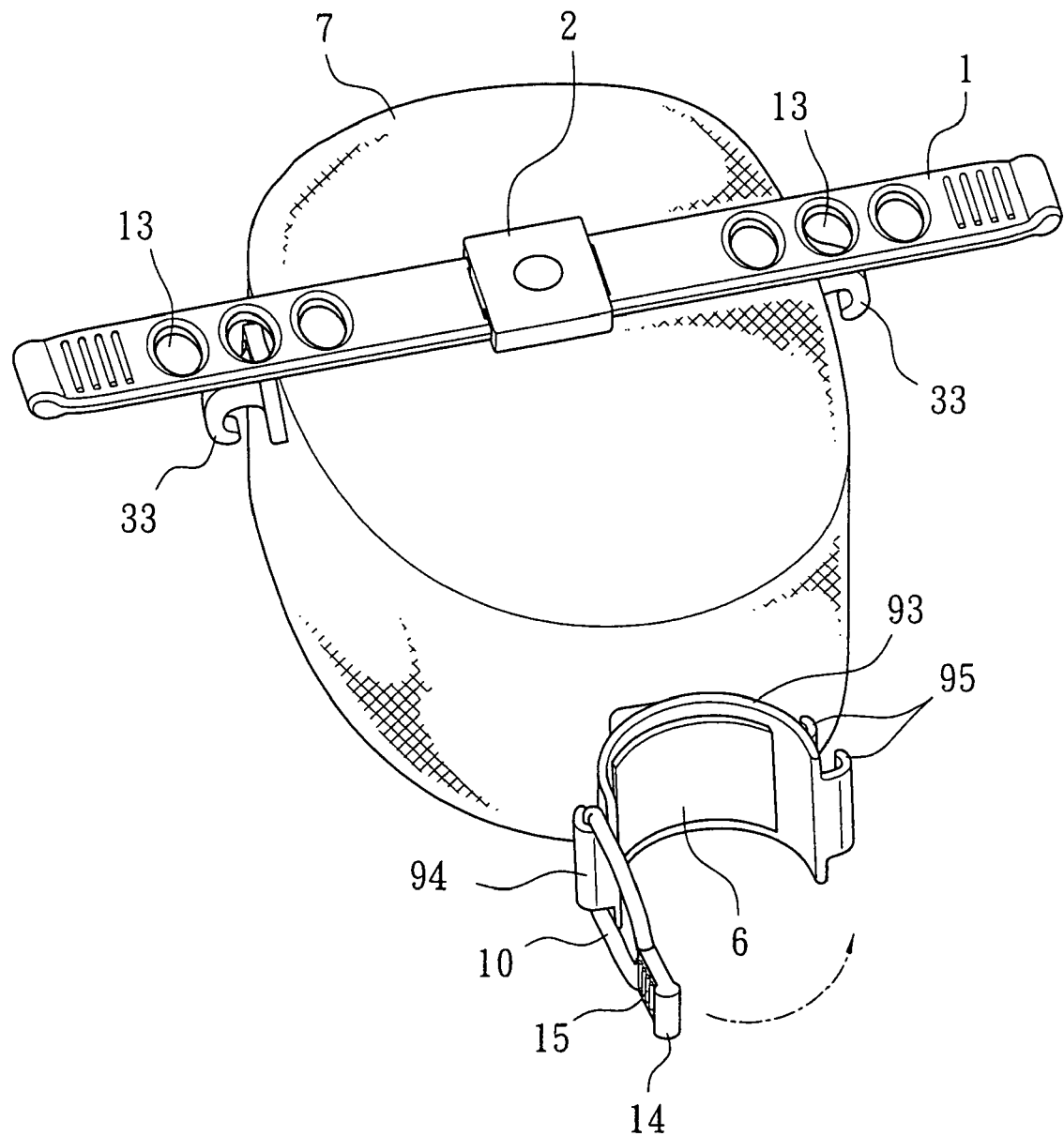
FIG. 2 shows the invention in combination with a seat bag.
Figure 3:
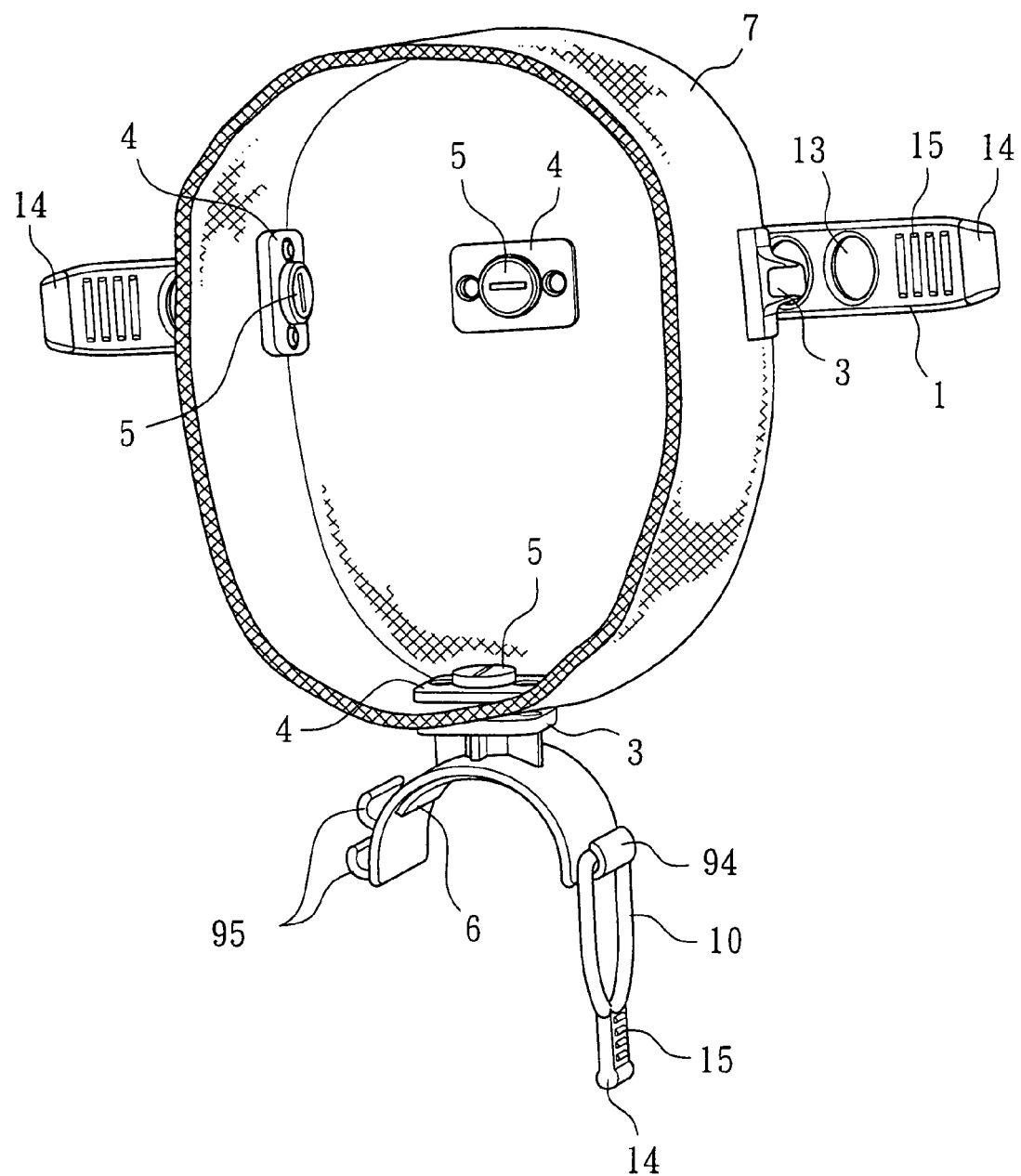
FIG. 3 shows the interior of the seat bag with the installment of the invention.

As shown in FIGS. 1 to 3, a rubber locking device according to the invention is composed of a rubber strip 1, a clamp board 2, two hook bases 3, four fastener boards 4, four screws 5, a soft spacer 6, a U fastener base 9 and a rubber ring 10.

The rubber strip 1 is in form of a long board provided with a central hole 11, two positioning crevices at two sides of the central hole 11, pluralities of locking holes 13 arranged on the rubber strip 1, a pull 14 and anti-slip roughness 15 at each of the extending rear ends of the rubber strip 1.

The clamp board 2 is provided at the bottom wit a central post, which is provided with positioning blocks 22 at two sides and a central screw hole 23 inside. Referring to FIGS. 2 and 3, when assembling the rubber strip 1 onto the top of the bicycle seat bag 7, it is required tat the seat bat 7 is provided with a through hole 71 and two slots 72, such that the central post 21 on the clamp board 2 goes through the central hole 11 of the rubber strip 1 and then the through hole 71 on the seat bag 7, while the positioning blocks 22 go through the positioning crevices 12 of the rubber strip 1 and then the slots 72 on the seat bag 7. By way of mounting a fastener board onto the central post 21 and fastening the screw 5 from the interior of the seat bag 7 through the screw hole 42 to the central screw hole 23, the rubber strip 1 can be firmly fastened to the seat bag 7. As the protruding positioning blocks 22 can be engaged into the positioning crevices 12 and then the slots on the bag 7, the clamp board 2 and rubber strip 1 would not rotate to deflect from each other.

Each of the hook bases 3 is provided with two protruding positioning posts 31 at one end, a hook at the other end, and a screw hole 32 between the two positioning posts 31. Further refer to FIGS. 2 and 3, to firmly fasten the hook bases 3 to the two sides of seat bag 7, the seat bag 7 need be provided with three holes at each side, such that the positioning posts 31 at the hook bases 3 will go through the holes 73 on the sides of the seat bag 7 and the fastener boards 4 will be mounted onto the positioning posts 31 via the positioning holes 41. A screw 5 is screwed from the interior of the seat bag 7 through the screw hole 41 to the screw holes 32 for fastening purpose.

The U locking base 9 is provided with two protruding positioning posts 91 at one end, a screw hole 92 between the two positioning posts 91, a U frame 93, which has a locking hook 94 at one end and two adjusting hooks 95 at the other end, corresponding to the positioning posts 92, and a soft spacer 6 for cushioning inside of the U frame 93. A rubber ring 10 having a pull 14 and anti-slip roughness 15 at one end is hooked with the locking hook 94. As shown, when assembling the U fastening base 9 to the front end of the seat bag 7, which is also provided with three holes 73, the two positioning posts 91 on the U fastening base 9 go through the holes 73 on the seat bag 7. The fastening board 4 is mounted onto the positioning posts 91 via the positioning holes 41 and screwed integrally to the seat bag 7 via a screw 5, which goes through the screw hole 42 to the screw hole 92.

Figure 4:
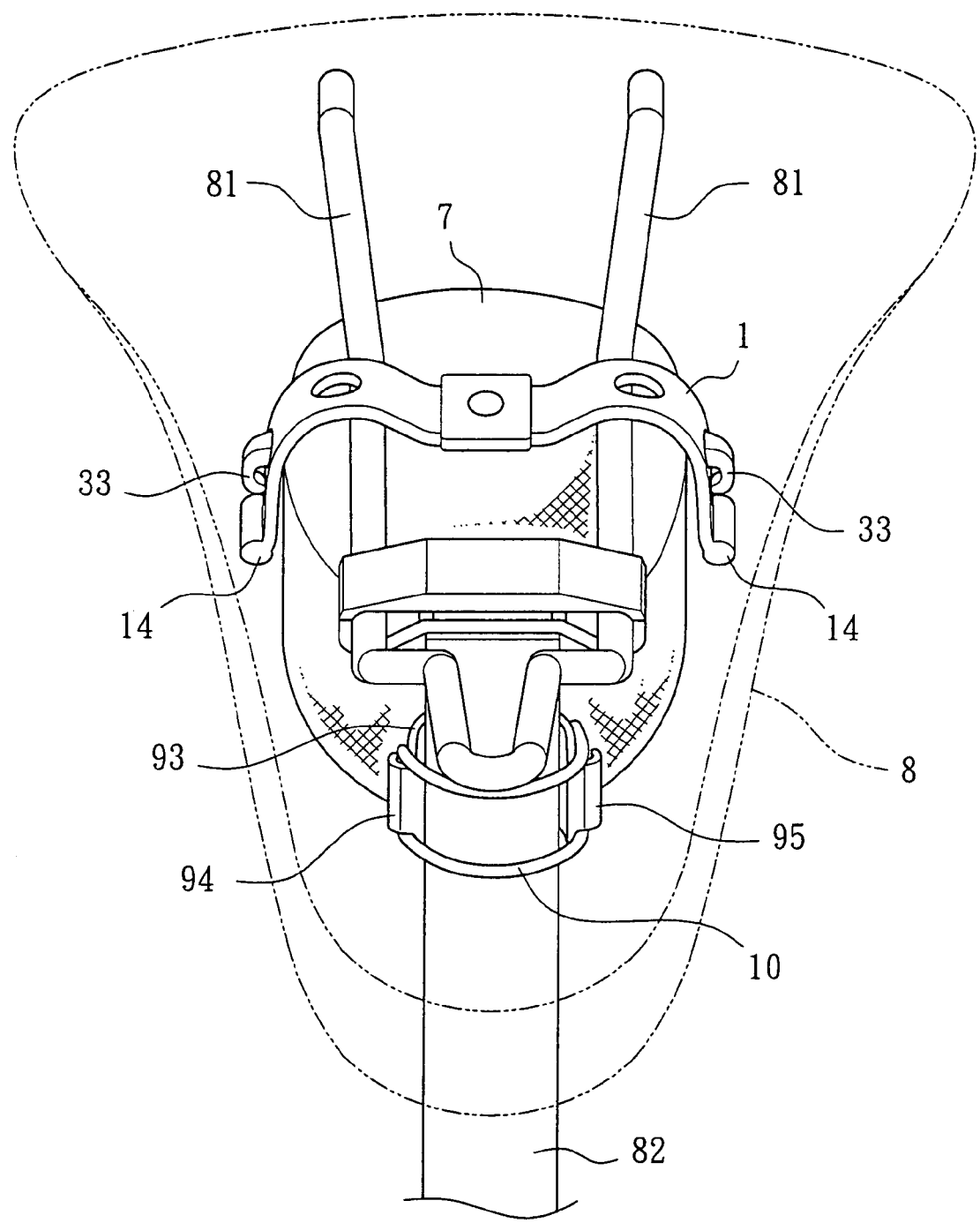
FIG. 4 is a top view of the invention when in use with the seat.
Figure 5:
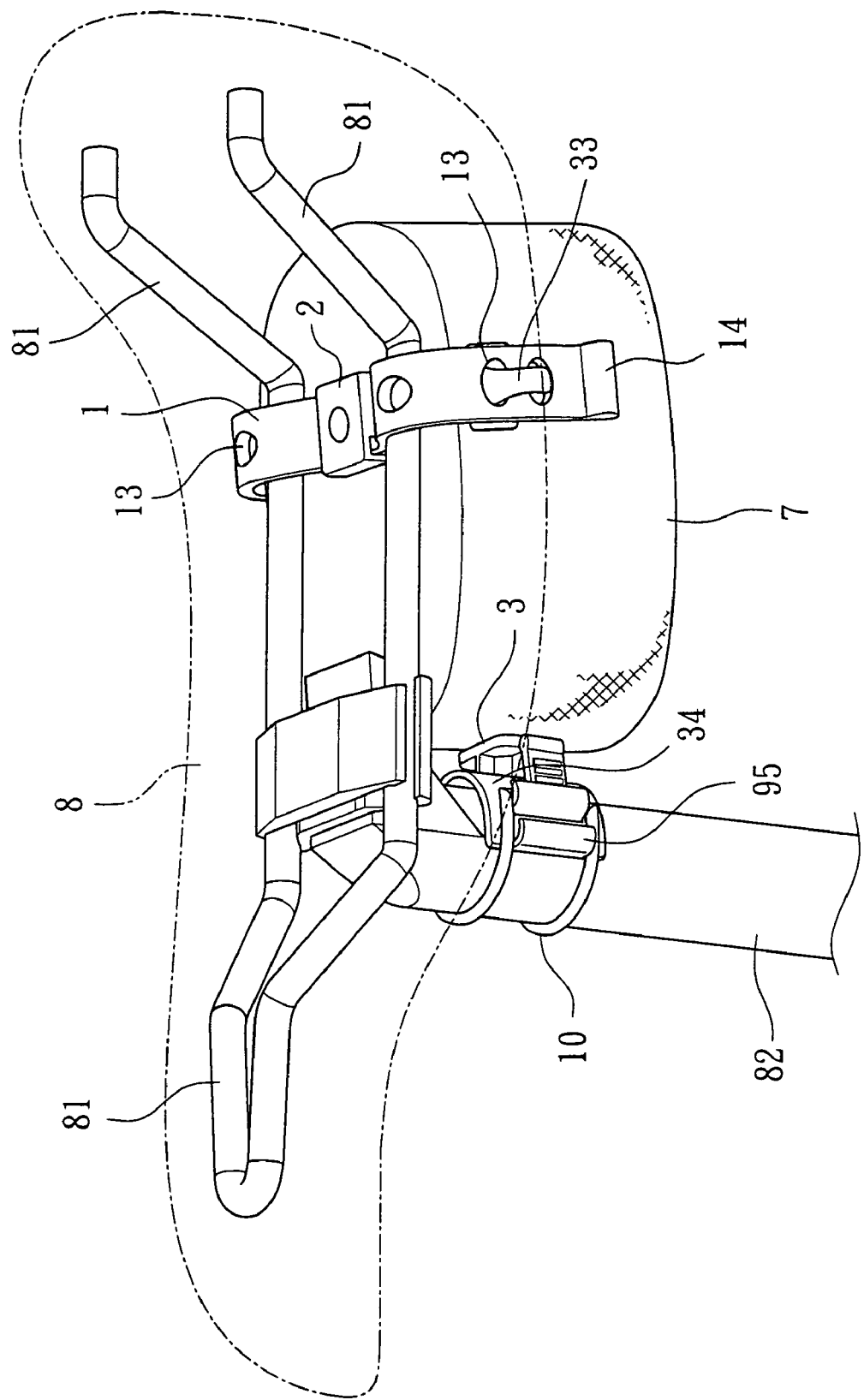
FIG. 5 is side view of the invention when in use with the seat and seat bag.

FIGS. 4 and 5 show the rubber locking device being combined to the seat bag 7. While there are two shafts 81 under the bicycle seat and a seat post 82 vertically and downwardly extending from the middle of the seat bottom, the U frame 93 of the U fastener base 92 is leant against the seat post 82, pulled by the user's fingers at the pull 14 such that the rubber ring 10 will flexibly transform to lock around one of the adjusting hooks 95. As there are two different sizes for the seat post 82, i.e. the small and the big, in the case of big seat post 82, the rubber ring 10 may be locked to the hook 95 adjacent to the free end of the U fastener base 9, whereas in the case of small seat post 82, the rubber ring 10 may be locked to the hook 95 at the remote end.

After the front end of the seat bag 7 has been well fastened, the rubber strip 1 can be resiliently pulled to lock into the hooks 33 with the locking holes 13 at the most preferred position. Accordingly, the seat bag 7 is fastened to the bicycle via the three positions at the two sides and the front, as well as via the rubber strip 1 which is full of resilience. The user can freely and conveniently assemble or detach the seat bag without the need of any tool.

In addition, while the rubber strip 1, hook bases 3 and the U fastener base 9 are fastened to the seat bag 7 via screws 5 going through bag canvas and the fastener boards 4, the fastening elements can be substituted by nails or the like appreciated by those skilled in the relevant art.

Concluded above, the invention describes a rubber locking device for a bicycle seat bag, which can be freely fastened to the underside of the seat. As the integral design of the invention is simple, it can allow DIY (do-it-yourself) by the user. The novelty features of this invention are certain and have been shown and described and are pointed out in the annexed Claims.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A rubber locking device for a bicycle seat bag comprising a rubber strip, a clamp board, two hook bases, a plurality of fastener boards and screws, a soft spacer, a U fastener base and a rubber ring, wherein the rubber strip is fastened onto a top of the bicycle seat bag, and a U fastener base and rubber ring at a front end; said rubber strip being provided with a central hole, two sides of which are provided with hollowed out positioning crevices; on a bottom of said clamp board is provided a central post, which is protrusively provided with positioning blocks at two ends, and a central screw hole at a center; at each of left and right sides of said bicycle seat bag is provided one of said hook bases; the front end of said bicycle seat bag is provided with said U fastener base, said U fastener base being provided with two protruding positioning posts at one end, a screw hole between said two positioning posts, a U frame at an opposite end, a hook engageable with said rubber at a first side of said U frame and two adjustment hooks a second side of said U frame; a plurality of locking holes are arranged on said rubber strip; one side of each said hook base is provided with two protruding positioning posts at one end, a hook at an other side, and a screw hole between said two positioning posts; and one end of said U fastener base is connected to said rubber ring.

2. The rubber locking device for a bicycle seat bag according to claim 1, wherein said rubber strip is provided at each of two ends thereof with a pull and anti-slip roughness.

3. The rubber locking device for a bicycle seat bag according to claim 1, wherein said hook bases, fastener boards and seat bag fabric fastened between are combined together via said screws.

4. The rubber locking device for a bicycle seat bag according to claim 1, wherein said rubber ring is provided at one end with a pull and anti-slip roughness.

* * * * *